July 26, 1927.　　　J. F. O'CONNOR　　　1,637,086
FRICTION SHOCK ABSORBING MECHANISM
Filed June 25, 1923　　　2 Sheets-Sheet 2
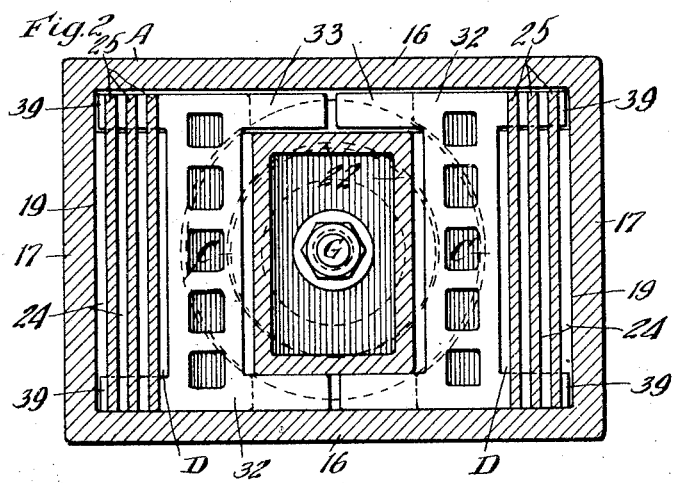
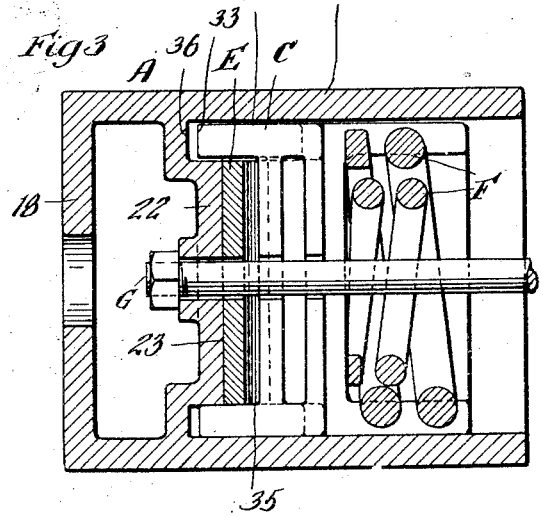
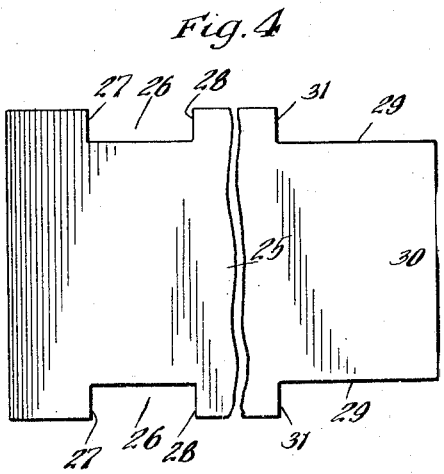
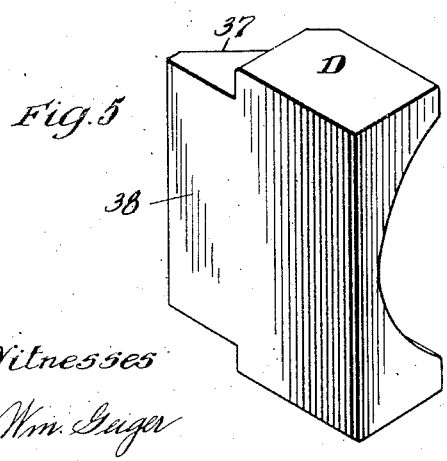
Witnesses
Wm. Geiger
Inventor
John F. O'Connor
By George I. Haight
Atty.

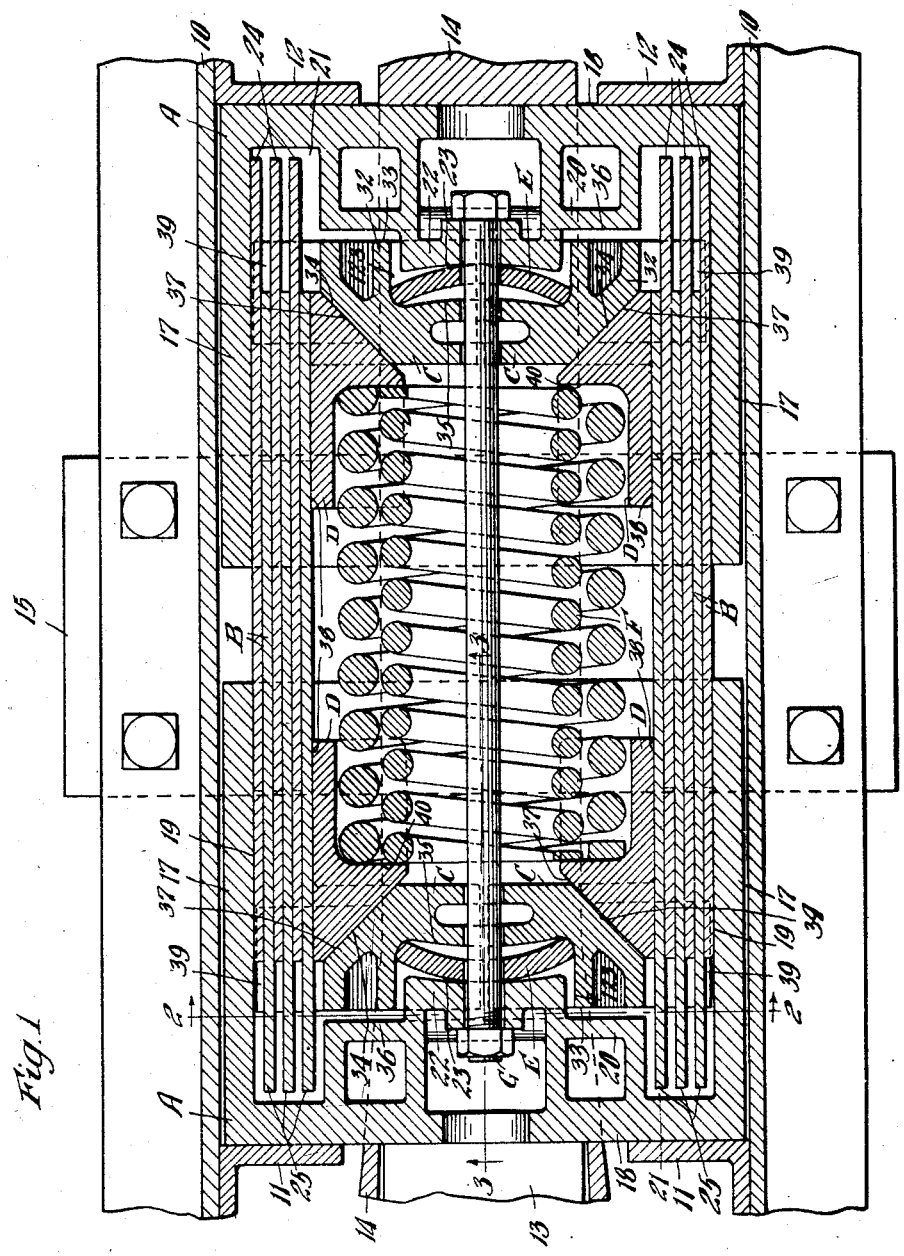

Patented July 26, 1927.

1,637,086

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed June 25, 1923. Serial No. 647,433.

This invention relates to improvements in friction shock absorbing mechanisms.

One object of the invention is to provide a friction shock absorbing mechanism particularly adapted for railway draft riggings, and which includes a plurality of friction plates, whereby high capacity is obtained, due to large frictional areas, and wherein a preliminary action of the followers and wedges takes place prior to the engagement of the end of the friction plates by the followers, to assure quick, certain and easy release of the parts.

A further object of the invention is to provide a friction shock absorbing mechanism including a separable wedging unit, wherein a preliminary spreading action of the wedging unit is had prior to the direct engagement of the same by the follower to thereby assure easy release of the parts by collapse of the wedging unit when the actuating pressure is removed.

Further objects and advantages of the invention will more clearly appear from the description and claims hereinafter following.

In the drawings, forming a part of this specification, Figure 1 is a horizontal, longitudinal, sectional view of a portion of a railway draft rigging, showing my improvements in connection therewith. Fig. 2 is a vertical, transverse, sectional view corresponding substantially to the line 2—2 of Fig. 1. Fig. 3 is a vertical, longitudinal, sectional view corresponding substantially to the line 3—3 of Fig. 1. Fig. 4 is a detailed, side elevational view, partly broken away, of one of the friction plates used in connection with my improved mechanism. And Fig. 5 is a detailed, perspective view of one of the friction shoes.

In said drawings, 10—10 designate channel draft sills of a railway car, to the inner faces of which are secured front stop lugs 11 and rear stop lugs 12. A portion of the drawbar is shown at 13, to which is attached a hooded yoke 14. The shock absorbing mechanism proper, including the front and rear follower casings, is disposed within the yoke 14 and the movable parts of the draft rigging are supported by a detachable saddle plate 15.

The improved shock absorbing mechanism proper, comprises, broadly, front and rear follower casings A—A; friction plates B—B; front and rear, sectional wedges C—C; front and rear pairs of friction wedge shoes D—D; a pair of curved spring plates E—E; a spring resistance F; and a retainer bolt G.

The front and rear follower casings A—A are of like construction and have horizontal top and bottom walls 16—16, vertical side walls 17—17, end walls 18 and inner, opposed, side friction surfaces 19. Each of the casings A is also provided with an integral, inwardly extending hollow projection 20 extending from the top to the bottom wall thereof and spaced with reference to the opposite side walls to provide recesses 21 adapted to accommodate the ends of the friction plates B. The projection 20 is provided with a reduced portion 22 and a pair of abutment faces 36. The reduced portion 22 has a concave end face 23 adapted to form a bearing for the spring plate E, the concavity of the face 23 being such that the spring plate will have full contact with the same when the mechanism is compressed.

The friction plates B are arranged within the casings A, and comprise two oppositely disposed groups. As herein shown, the groups of plates B each comprise three plates 24 and three plates 25, the plates 24 and 25 being alternated, with a plate 24 of each group arranged outermost and in contact with the inner faces 19 of the adjacent side walls 17 of the front and rear shells A. The plates 24 and 25 are of like construction and, as best shown in Fig. 4, each of the plates 24 and 25 is recessed at its upper and lower edges near one end thereof, as indicated at 26 to provide abutment shoulders 27 and 28. At the opposite end, each plate is cut away at the upper and lower sides as indicated at 29 to provide a portion 30 of reduced height and upper and lower abutment shoulders 31—31.

The sectional wedges C are of like construction each comprising a pair of similar wedge blocks 32—32. Each of the wedge blocks is provided with a flat outer face 33 and an inner wedge face 34. The flat outer face is cut away at the side nearest the axis of the mechanism to provide an in-set convex surface 35 correspondingly curved to the surface 23 of the projection 20 and a side face 123 parallel to the axis of the mechanism. The wedge faces 34 of each pair of blocks 32 converge inwardly of the mechanism and are adapted to co-act respectively with the front and rear wedge friction shoes D. The cut away portions of the blocks forming the front and rear wedges C are adapted to register and the surfaces 123 of each pair of blocks are adapted to form abutments for the opposite ends of the corresponding spring plate E, the surface 23 forming a seat for the same when the parts are compressed. The flat faces 33 of the wedge blocks 32 are normally slightly spaced from the flat inner faces of the walls 36 at opposite sides of the projection 20 of each of the casings A.

Each of the wedge sections 32 is provided with upper and lower laterally extending lugs 39 adapted to extend into the recesses 26 at the upper and lower edges of the friction plates and engage with the shoulders 27 thereof to effect the restoration of the plates to normal position, as hereinafter described.

The springs E are in the form of curved plates and are interposed respectively between the front and rear sectional wedges C and the extensions 22 on the front and rear casings A, and are adapted to normally hold the wedges C in spaced relation with reference to the abutment faces 36 on the projections 20.

The friction wedge shoes D are four in number, and are arranged in pairs at opposite ends of the shock absorbing mechanism, each pair co-acting with the corresponding sectional wedge C. Each of the friction shoes D is provided with a wedge face 37 adapted to co-act with a wedge face 34 of one of the wedge blocks 32, an outer elongated friction surface 38 adapted to co-act with the innermost friction plate 25 of one of the groups of plates B, and a flat rear face 40 forming an abutment for the spring resistance F, which is interposed between the front and rear pairs of friction shoes.

The mechanism is held in assembled relation and under initial compression by a retainer bolt G anchored within the projections 20 on the front and rear casings A and extending through the inner coil of the spring resistance F, alined openings in the plates E and longitudinally extending grooves in the sections 32.

As clearly shown in Fig. 1, the plates 24 and 25 are reversed end for end, the plates 24 being connected to the sections 32 of the rear wedge C by the lugs 39 of the latter engaging within the recesses 26 of the plates, the reduced portions 30 at the opposite ends of the plates 24 extending between the upper and lower lugs of the sections 32 of the front wedge C. The plates 25 are connected to the sections 32 of the front wedge C in a similar manner and have the reduced portions at the opposite ends extending and working between the upper and lower lugs on the sections 32 of the rear wedge C. The ends of the plates 24 and 25, adjacent the recesses 26, are normally slightly spaced from the inner faces of the end walls of the rear and front casings A respectively, the spacing preferably corresponding to that between the faces 36 on the projections 20 and the wedge blocks 32.

The operation of my improved shock absorbing mechanism is as follows, assuming an inward or buffing movement of the front follower casing A. The initial action will be an inward movement of the front follower casing A relatively to the sectional wedge C and a bodily, rearward movement of lesser extent of the wedge C, plates 24 and wedge shoes D, therewith, thus compressing the spring resistance F and forcing the rear shoes D with greater pressure against the rear sectional wedge C and moving the latter relatively to the rear follower casing A. During this action, the sections 32 of the front and rear wedges will be forced apart, setting up a wedging action between the same and the front and rear pairs of shoes D and placing the groups of plates under lateral pressure. This action will continue until the expansion of the wedges C is limited by the faces 36 on the front and rear follower casings A engaging the faces 33 of the sectional wedges C. At the same time, the inner faces of the end walls 18 of the front and rear follower casings A will respectively engage the adjacent ends of the friction plates 25 and 24, whereupon, the plates 25 will be moved rearwardly with reference to the plates 24. As the plates 25 slide rearwardly upon the plates 24 the frictional resistance offered will be very great, due to the pressure under which the plates are put by the action of the wedges and wedge shoes. Friction will also be created between the friction surfaces 19 of the front follower casing A and the outermost plate 24 of each group, as the casing moves rearwardly with reference to the same. During draft, the action will be the reverse of that just described, the front follower casing being held stationary by the stop lugs 11 and the rear follower casing moved forwardly.

In both buff and draft, the movement of one casing A toward the other continues until the compression force is relieved, or until the inner ends of the casings abut, whereupon, the pressure will be transmitted directly through the casings to the stop lugs, the casings acting as pressure transmitting columns.

Upon removal of the actuating pressure, the spring plates E will force the follower casings outwardly and permit the sectional wedges to collapse, thereby reducing the transverse pressure on the shoes and friction plates and permitting the spring resistance F to restore all of the parts to normal position, the friction plates 24 and 25 being returned to normal position by the lugs on the wedge blocks 32 engaging with the shoulders 27 of the plates. Proper spacing between the wedges C and the abutment faces 36 of the front and rear followers will be effected by the spring plates E. Although the spring plates E are designed to be of considerably less capacity than the spring resistance F, the action of the latter will be balanced, although the same is under initial compression, due to the resistance offered against outward movement of the shoes D by the co-acting friction faces of the shoes and plates and the resistance offered against outward movement of the wedges C by the frictional engagement of the plates 24 and 25.

As wear occurs on the various friction surfaces and wedge faces, compensation therefor will be had by the front and rear wedge shoes moving apart due to the expansion of the spring resistance F, which, as hereinbefore described, is under initial compression.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a follower acting member; of friction means held against lateral movement, said friction means and follower member being relatively movable longitudinally of the mechanism; a spring resistance; a friction wedge pressure creating system including a plurality of wedge friction shoes co-operating with said friction means, a sectional wedge and spreading means interposed between said follower and wedge for effecting expansion of the latter upon relative approach of the follower and wedge, said spreading means being held against collapse between said follower and wedge during compression of the mechanism, and co-acting means on said wedge and follower for limiting the relative movement thereof, whereby the expansion of the wedge is limited.

2. In a friction shock absorbing mechanism, the combination with a follower acting member; of friction members at opposite sides of the mechanism held against lateral outward movement, said friction members and follower acting member being relatively movable longitudinally of the mechanism; a spring resistance; a friction wedge system co-operating with said friction members, said system including an expansible wedge and means for expanding said wedge and maintaining the same expanded upon relative approach of said follower and wedge; and means on the follower adapted to directly engage the wedge after a predetermined relative movement of said follower and wedge to move the latter in unison with the follower, whereby the expansion of the wedge is limited.

3. In a friction shock absorbing mechanism, the combination with a follower; of lateral pressure resisting means having friction surfaces; a main spring resistance; a friction wedge system co-operating with said means, said system including a plurality of friction shoes, an expansible wedge normally spaced from said follower, and means interposed between said follower and wedge for effecting expansion of the latter, said means being adapted to be forcibly spread upon the relative approach of said follower and wedge and return to normal condition to permit collapse of the wedge when the actuating force is removed; and means on said follower adapted to directly engage said wedge and actuate the same upon a pre-determined relative movement of the wedge and said follower.

4. In a friction shock absorbing mechanism, the combination with front and rear follower members adapted to move toward and from each other; of two, laterally spaced groups of longitudinally extending, intercalated, friction plates adapted for relative longitudinal movement upon relative approach of said follower members, said plates being responsive to laterally applied pressure thereon; means for applying lateral pressure to said groups of plates upon relative approach of the follower members, including a longitudinally arranged spring resistance located between the groups of plates, and expansible wedges; yielding means interposed between said follower members and said wedges; and means for limiting the relative approach of said followers and wedges whereby the expansion of said wedges is limited.

5. In a friction shock absorbing mechanism, the combination with a follower; of a plurality of groups of intercalated, relatively movable, friction plates; means for holding said plates against lateral outward movement, a plurality of wedge shoes co-acting with said plates; an expansible wedge co-acting with said shoes, said wedge including relatively movable sections and a resilient curved plate interposed between the follower and said sections and means on the follower adapted to limit the relative movement of the same and the wedge.

6. In a friction shock absorbing mechanism, the combination with a follower; of a plurality of groups of intercalated, relatively movable, friction plates; means for opposing lateral outward movement of said plates; a plurality of wedge shoes co-acting with said plates; an expansible, sectional wedge co-acting with said shoes, said sectional wedge including a resilient curved plate interposed between the sections thereof and between said sections and the follower; and means on the follower adapted to limit the relative movement of the same and the wedge.

7. In a friction shock absorbing mechanism, the combination with oppositely arranged, hollow, front and rear follower casings provided, respectively, with longitudinally extending friction surfaces on the interior thereof, said casings being normally spaced apart and adapted to move relatively to each other; of a wedge actuated, lateral pressure creating means between said followers; resilient means interposed between said followers and wedge pressure creating means; means on said followers adapted to directly engage and move said wedge means after a predetermined movement of the followers toward the wedge means; and longitudinally arranged friction plates adapted for relative movement upon relative movement of the follower casings, said plates being divided into two groups on opposite sides of said wedge pressure creating means.

8. In a friction shock absorbing mechanism, the combination with a plurality of sets of relatively movable, intercalated, friction plates, divided into two groups; of a front follower casing co-acting with one set of plates, said casing being provided with longitudinally arranged, interior, friction surfaces; a rear follower casing co-acting with the other set of plates, said casing being provided with longitudinally arranged, interior, friction surfaces; pairs of wedge shoes, each of said shoes having a flat face co-acting with the inner side of one of said groups of friction plates; a spring resistance co-acting with said pairs of shoes; a pair of laterally separable wedge blocks associated with each follower casing and co-acting with the corresponding adjacent pair of shoes; resilient means interposed between each pair of wedge blocks and co-acting with the corresponding follower casing to effect a spreading action of the wedge blocks upon movement of said casing toward each other; and means on said follower casings adapted to directly engage said wedge blocks after a predetermined spreading action of said blocks, and move the same longitudinally in unison therewith.

9. In a friction shock absorbing mechanism, in combination: a follower acting casing; a follower member, said member and casing being relatively movable; two laterally separated sets of friction plates disposed partly within said follower casing and having their movement resisted by said follower member; two additional, laterally separated sets of friction plates, the plates of each said additional set being alternated with those of one of the corresponding first named sets with the alternating plates relatively longitudinally movable, the plates of said additional sets having one set of their ends normally slightly spaced from said follower casing and adapted to be directly actuated by the latter after a predetermined preliminary action; lateral wedge-pressure-creating means interposed between the groups of alternated plates and co-operable therewith, said means including, wedge elements and spring means for expanding said elements, said spring means being directly actuated by said follower casing and the latter being adapted also, after a predetermined preliminary action, to directly actuate said wedge elements, said wedge elements having shouldered engagement with the plates of said additional sets for restoring the latter to normal position after a compression stroke, means associated with said follower member for restoring the first named sets of plates to normal position after a compression stroke; and a spring resistance co-operating with said means.

10. In a friction shock absorbing mechanism, in combination: two end follower casings; two laterally separated groups of intercalated friction plates, alternate plates of each group having one set of their ends normally slightly spaced from one of the follower casings and the opposite ends of the remaining plates correspondingly spaced from the other of the follower casings; a longitudinally arranged spring resistance disposed between said groups of plates; and lateral wedge-pressure-creating means at each end of said spring resistance and interposed between the groups of plates, each of said means including, laterally separable wedge elements and spring means interposed between said elements and the corresponding adjacent follower casing, the follower casings being adapted to directly actuate said spring means for a predetermined preliminary amount of spring action and to thereafter directly engage said wedge elements and the corresponding adjacent friction plates, said wedge elements having shouldered engagement with alternate plates of the two groups, for restoring said plates to normal position after a compression stroke.

In witness that I claim the foregoing I have hereunto subscribed my name this 22nd day of June 1923.

JOHN F. O'CONNOR.